United States Patent
Landau et al.

(10) Patent No.: US 7,461,338 B2
(45) Date of Patent: Dec. 2, 2008

(54) ADVERTISING MARKUP LANGUAGE

(75) Inventors: Michael Landau, Greenbrae, CA (US);
Evan Horowitz, San Francisco, CA (US)

(73) Assignee: Essociate, Inc., San Francisco, CA (US)

( * ) Notice: Subject to any disclaimer, the term of this patent is extended or adjusted under 35 U.S.C. 154(b) by 528 days.

(21) Appl. No.: 11/031,456

(22) Filed: Jan. 7, 2005

(65) Prior Publication Data
US 2006/0156283 A1 Jul. 13, 2006

(51) Int. Cl.
*G06F 17/00* (2006.01)
(52) U.S. Cl. .................. 715/237; 715/205
(58) Field of Classification Search .......... 715/513, 715/501.1, 205, 234, 237, 239; 705/14; 707/E17.127
See application file for complete search history.

(56) References Cited

U.S. PATENT DOCUMENTS

| | | | |
|---|---|---|---|
| 6,256,739 B1 * | 7/2001 | Skopp et al. .................. 726/2 |
| 2005/0064852 A1 * | 3/2005 | Baldursson .............. 455/414.2 |

OTHER PUBLICATIONS

"The New York Times Advertising Markup Prototype", Zedak Corporation, downloaded from http://www.zedak.com/admarkup, 1998, pp. a-c, i-iii, 1-69.*
"Trading Partner Agreement Markup Language (tpaML)", downloaded from http://web.archive.org/web/20030605130304/http://xml.coverpages.org/tpa.html, Sep. 6, 2000, pp. 1-6.*
"AdMarkup XML DTD for Classified Advertising", downloaded from http://xml.coverpages.org/admarkup.html, Jan. 2002, pp. 1-2.*
Li, Lei, et al, "E-Commerce: A Software Framework for Matchmaking Based on Semantic Web Technology", Proceedings of the 12th International Conference on World Wide Web WWW '03, May 2003, pp. 331-339.*

* cited by examiner

*Primary Examiner*—Laurie Ries
(74) *Attorney, Agent, or Firm*—Perkins Coie LLP

(57) ABSTRACT

A system, method, and computer program are provided for a sophisticated standardized Advertising Markup Language, a co-operative central Advertising Registry, and user-interface enabled advertising functionality.

17 Claims, 5 Drawing Sheets

200

| | |
|---|---|
| 202 | < affiliate |
| 204 | uid='1234568790' |
| 206 | profile='5' |
| 208 | width='460' |
| 210 | height='68' |
| 212 | type='banner' |
| 214 | methods='cpa,cpc,banner_exchange' |
| 216 | style='static' |
| 218 | media-types='text,gif,jpg,avi,mpeg,flash,java' |
| 220 | rotation='on' |
| 222 | refresh-rate='20' |
| 224 | keyword1='football'<br>keyword2='Berkeley California'<br>keyword3='sports' |
| 226 | avoid_keyword='stanford' |
| 228 | subtrack='home_page' |
| 230 | position='absolute' |
| 232 | x-pos='0px'<br>y-pos='0px' |
| 234 | alt='advertisement' |
| 236 | site_rating='GA' |
| 238 | language='en' |
| 240 | default-img='banner.gif' |
| 242 | default-link='home.html' |
| 244 | specific_id='12345' |
| 246 | specific_program='xthreadz' |
| 248 | return_url='http:/affiliatemarkup.org/' |
| 250 | border='0' |
| 252 | target='_new' |
| 254 | country='US' |
| 256 | region='CA' |
| 258 | exact='disabled' |
| 290 | > |
| 292 | < a href='home.html' ><br>< img src='banner.gif' > < /a > |
| 294 | < /affiliate > |

FIG. 2

ADVERTISING MARKUP LANGUAGE

CROSS-REFERENCE TO RELATED PATENTS AND APPLICATIONS

The present invention is related to Landau et al.'s U.S. Pat. No. 6,804,660, entitled System method and article of manufacture for Internet based affiliate pooling, and Landau et al.'s U.S. patent application Ser. No. 10/005,514, entitled System method and article of manufacture for affiliate tracking for the dissemination of promotional and marketing material via e-mail, the contents of which are incorporated herein by reference.

BACKGROUND OF THE INVENTION

1. Field of the Invention

The present invention relates to advertising, and more particularly to user-interface advertising enabled through the use of a markup language and/or advertising registry/co-operative.

2. State of the Art

Over the last few years the Internet and e-Commerce have become an important, if not indispensable, part of everyday personal and business life. Because much of the information contained on the Internet is available free of charge, excepting general network access fees, subsidization of free content is often achieved through some form of online advertising. As such, online advertising models and mechanisms are fundamental in the development and evolution of the online environment. The definitions at the web links below, hereby incorporated by reference, provide a brief introduction to many of the important topics related to digital advertising discussed herein.

Ad Banner http://www.netlingo.com/lookup.cfm?term=ad+banner
Affiliate Marketing http://www.netlingo.com/lookup.cfm?term=affiliate+marketing
Affiliate http://www.netlingo.com/lookup.cfm?term=affiliate
AVI http://www.netlingo.com/lookup.cfm?term=AVI
Banner Exchange http://www.netlingo.com/lookup.cfm?term=banner+exchange
Cache http://www.netlingo.com/lookup.cfm?term=cache+or+caching
CGI http://www.netlingo.com/lookup.cfm?term=cgi
Client http://www.netlingo.com/lookup.cfm?term=client
CPA http://www.netlingo.com/lookup.cfm?term=CPA
CPC http://www.netlingo.com/lookup.cfm?term=CPC
CPM http://www.netlingo.com/lookup.cfm?term=CPM
Database http://www.netlingo.com/lookup.cfm?term=database
DHTML http://www.netlingo.com/lookup.cfm?term=DHTML
DRM http://www.netlingo.com/lookup.cfm?term=DRM
Dynamic Rotation http://www.netlingo.com/lookup.cfm?term=dynamic+rotation
e-Commerce http://www.netlingo.com/lookup.cfm?term=e-commerce
Flash http://www.netlingo.com/lookup.cfm?term=flash
GIF Image http://www.netlingo.com/lookup.cfm?term=GIF+or+.gif
Hosting http://www.netlingo.com/lookup.cfm?term=hosting
HTML http://www.netlingo.com/lookup.cfm?term=HTML
HTTP http://webopedia.com/TERM/H/HTTP.html
IAB http://www.netlingo.com/lookup.cfm?term=IAB
Impressions http://www.netlingo.com/lookup.cfm?term=impressions
Interface http://www.netlingo.com/lookup.cfm?term=interface
Internet http://www.netlingo.com/lookup.cfm?term=internet
Interoperability http://www.netlingo.com/lookup.cfm?term=interoperability
Interstitial http://www.netlingo.com/lookup.cfm?term=interstitial
ISO http://webopedia.com/TERM/I/ISO.html
ISOC http://www.netlingo.com/lookup.cfm?term=ISOC
Java http://www.netlingo.com/lookup.cfm?term=java
Javascript http://www.netlingo.com/lookup.cfm?term=javascript
JPG Image http://www.netlingo.com/lookup.cfm?term=JPG+or+.jpg
MAC Address http://webopedia.com/TERM/M/MAC_address.html
MPEG http://www.netlingo.com/lookup.cfm?term=MPEG
Navigation Bar http://www.netlingo.com/lookup.cfm?term=nav+bar+or+navigation+bar
News Reader http://www.netlingo.com/lookup.cfm?term=newsreader
NNTP http://www.netlingo.com/lookup.cfm?term=NNTP
Online Ad http://www.netlingo.com/lookup.cfm?term=online+ad
Operating System http://www.netlingo.com/lookup.cfm?term=operating+system
P2P http://www.netlingo.com/lookup.cfm?term=P2P
PHP http://www.netlingo.com/lookup.cfm?term=PHP
Pixel http://www.netlingo.com/lookup.cfm?term=pixel
Pop-up Ads http://www.netlingo.com/lookup.cfm?term=pop-up+ad
Program http://www.netlingo.com/lookup.cfm?term=program
Proxy http://webopedia.com/TERM/p/proxy_server.html
Publisher http://www.netlingo.com/lookup.cfm?term=publisher
Query String http://webopedia.com/TERM/q/query_string.html
Real Estate http://www.netlingo.com/lookup.cfm?term=real+estate
RSS http://www.webopedia.com/TERM/R/RSS.html
Server http://www.netlingo.com/lookup.cfm?term=server
Session http://webopedia.com/TERM/U/user_session.html
Spam http://www.netlingo.com/lookup.cfm?term=spam
Specifications http://www.netlingo.com/lookup.cfm?term=specifications
Spyware http://www.netlingo.com/lookup.cfm?term=spyware
Standards http://www.netlingo.com/lookup.cfm?term=standard
String http://www.netlingo.com/lookup.cfm?term=string
Surfing http://www.netlingo.com/lookup.cfm?term=surf+or+surfing
Tag http://www.netlingo.com/lookup.cfm?term=tag
Traffic http://www.netlingo.com/lookup.cfm?term=traffic
URL http://www.netlingo.com/lookup.cfm?term=URL
W3C http://www.netlingo.com/lookup.cfm?term=W3C
Web Browser http://www.netlingo.com/lookup.cfm?term=browser
Webmaster http://www.netlingo.com/lookup.cfm?term=webmaster
XML http://www.netlingo.com/lookup.cfm?term=XML Although the current models of Internet advertising (as described in the definitions above) have reached a certain level of maturity, there are still many limitations and persistent problems. The present invention improves on many of these deficiencies by creating a new online affiliate advertising paradigm, as described further below.

BRIEF DESCRIPTION OF THE DRAWINGS

The invention, together with further advantages thereof, may best be understood by reference to the following description taken in conjunction with the accompanying drawings in which:

FIG. 2 is a suitable embodiment of a markup tag implementing the Affiliate Markup Language;

SUMMARY OF THE INVENTION

Figure 1:
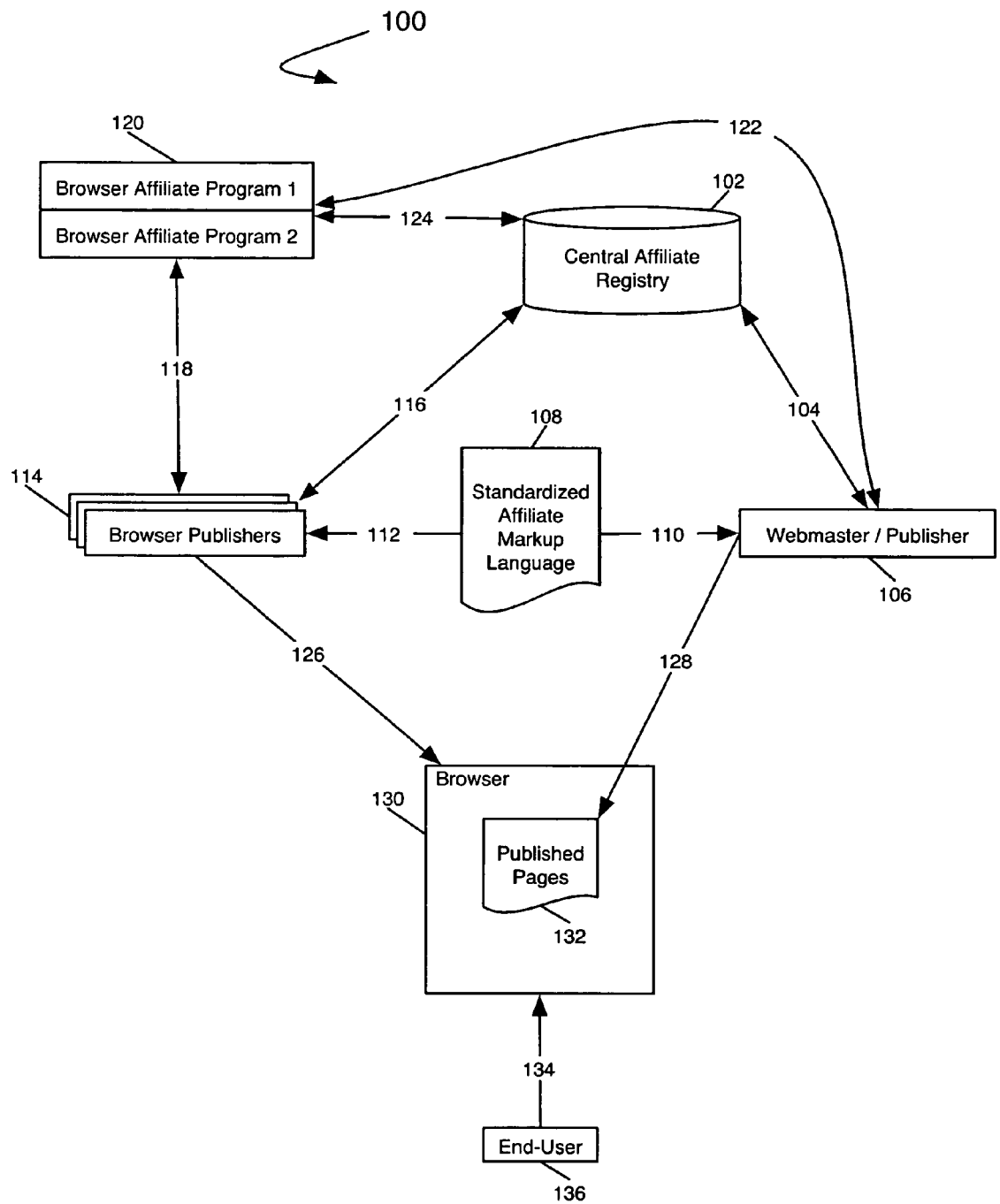
FIG. 1 is a suitable embodiment of the invention.

The present invention teaches a variety of techniques and mechanisms enabling user-interface advertising. According to one embodiment of the invention, a standardized Advertising Markup Language is created and implemented for user-interface advertising. An Affiliate Markup Language is a suitable embodiment of such an Advertising Markup Language. Harnessing the security, infrastructure, and advanced functionality of web browsers, desktop applications, and/or operating systems, affiliate advertisers are provided a new, straightforward, and more powerful platform for implementing user-interface advertising. Advantageously, this new consolidated affiliate perspective also retains the best features of current advertising models. Once a standardized markup language is adopted, a central Affiliate Registry co-operative is created to further the development of the markup language and oversee issuance of universal affiliate identifiers to webmasters and site publishers. The Affiliate Registry can also be used as a default advertising network if the browser/application/system software publisher does not maintain its own affiliate network for aggregating advertisements to display.

DETAILED DESCRIPTION OF THE INVENTION

While the invention as contemplated encompasses a general Advertising Markup Language for use with all varieties of user-interface advertising, a complete understanding of the invention is best achieved through the detailed description of a particular embodiment: an Affiliate Markup Language.

Browser Controlled/Enabled Affiliate Advertising

In the current structure of affiliate advertising, the web browser (or application or computer operating system) has very little active participation, except as relates to rendering the HTML within a web page to display/enable the advertising. Stated simply, the web browser and the webmaster whose page is being displayed in that browser do not have a direct relationship. The present invention creates a more direct relationship by establishing a markup language specifically for affiliate advertising. For example, the affiliate advertising markup language may be implemented by a standardizing authority and browser/application/system software providers, establishing numerous benefits for all entities involved. Additionally, this new model solves many problems caused by current online advertising systems.

Simplistically, the browser is taking control of the advertising on/in/around a web page because the webmaster is specifically allowing the browser to do so by including defined tags from the markup language in the HTML of the webpage. The webmaster directly benefits from the security, added functionality and economies of scale of browser advertising, and the browser companies get new "real estate" for advertising and subsequent revenue. Similarly, because the browser or application provider is in a "trusted" position, the surfer will also have a higher confidence level in the advertisement, thereby increasing the overall effectiveness of online advertising.

An embodiment of the present invention has two components whose roles are summarized below.

The Affiliate Markup Language: a standardized, flexible markup language, similar to HTML, but embedded with specialized affiliate advertising functionality for browser/application/system publishers to implement, and webmaster/publishers to utilize in web pages or other online/network content. As will be appreciated, the Affiliate Markup Language can be implemented in a variety of ways, for use on a variety of platforms.

The Central Affiliate Registry: a co-operative or clearinghouse organization to facilitate online advertising and the many facets of the Affiliate Markup Language.

Possible Functions of the Central Affiliate Registry might include:
a) issuing unique universal affiliate identifiers to webmaster/publishers for use with the affiliate markup language.
b) maintaining core affiliate mapping & advertising systems/routers using worldwide distributed infrastructure.
c) correlating unique identifiers for real-time affiliate pooling purposes.
d) maintaining an up-to-date contact database with webmaster/publisher information.
e) providing centralized uniform statistics reporting and third-party auditing services to promote consistency and advertiser confidence.
f) acting as a default advertising network for browser/application/system publishers that do not maintain their own advertising network.
g) issuing affiliate/advertising commissions/payouts to webmaster/publishers.
h) deterring fraud by verifying webmaster/publisher identity.
i) providing affiliate advertising information and resources for webmaster/publishers.
j) developing and fostering technology for improved markup language functionality and widespread browser/application/affiliate-program implementation.

Expanded Functionality and Features

One advantage of the present invention is the wide array of increased functionality and features available by integrating advertising mechanisms directly into the browser/application/system software. For starters, HTML has certain inherent limitations in the types of functions it is able to perform because of security concerns and the need for a universal and flexible markup language. These constraints limit the functionality of current Internet advertising and cause it to be less efficient than it should be.

Adding to this problem, many web browsers rely on ancillary helper applications, plug-ins, and sometimes "toolbars" to perform functionality outside of the browser, such as viewing certain types of media files. While most of these applications are friendly, many external applications are forms of malicious Spyware meant to inundate end-users computer with pop-up advertisements or steal sensitive personal or financial information. Ironically, much of the malicious software that is downloaded, and subsequently installed, originates from some form of abusive Internet advertising in the first place. Because of the annoyance caused by rampant and malicious pop-up advertising, many software companies have developed defensive "pop-up" blockers. Similarly, popular software applications/tools that "clean" web pages of advertising by removing banners or preventing them from loading also exist. For years advertising has been tolerated because it has subsidized access to free information, but now access to information is considered an entitlement by end-users. As such, it is clear that there is a backlash that has developed against online Internet advertising because of the abuses and/or weaknesses of the current system.

Within the framework of the present invention, many of these problems are solved:

1. Because the browser/application is not limited by the constraints of HTML, advertisements can be more dynamic, interactive and functional. New advertising means and mechanisms, such as "skinning" the web browser or establishing an advertising "crawl," become possible. While many novel advertising mechanisms already exist in Java, Javascript, and Flash, implementing similar, yet improved, functionality directly within the browser/application provides many advantages. Advertising rotation, refreshing, interstitials, pop-ups, scrolling messages, and other advertising mechanisms all benefit from browser/application implementation, if for no other reason than the simplicity with which a webmaster/publisher could now implement the advanced features using the relative simplicity of the Affiliate Markup Language. The new potential of this functionality will be apparent to those skilled in the art.

2. If the surfer is aware that the browser/application is controlling the advertising, the surfer is likely to have increased trust in the source of the advertisement, and should also feel reasonably confident there are no malicious components in the ad. Consequently, the effectiveness of the advertising will increase with the decline in skepticism of the end-user.

3. Because the browser/application/system directly interacts with the advertising elements, more robust and accurate advertising statistics are possible. Despite all the technical advantages made in online advertising over the past few years, the uncertainty in the reporting mechanisms has not been adequately addressed. Proxies, caching, geo-targeting, firewalls, and dynamic network connections all affect the reliability of these statistics. The limitations and drawbacks of current hit/impression counting systems will be apparent to those skilled in the art. The present invention improves on previous techniques by reliably moving statistics registering mechanisms from the web page HTML or web server and into the browser/application/system.

For example, instead of relying on an individual IP address to determine a "unique" end-user, statistics mechanisms within the browser or application could utilize the individuals MAC Address or other uniquely identifying attributes, along with the IP address to more accurately determine uniqueness. In a similar manner, the browser or application could also more accurately identify "refresh" or "reload" instances so as to eliminate these processes from artificially inflating advertising statistics. These improved statistics also have the ability to prevent advertising fraud by preventing intentional misuse of existing statistics shortcomings.

Although some currently existing browsers do have rudimentary advertising functions built-in, these often take the former of a simple banner display within the navigation bar of the browser. These browsers do not have any type of affiliate advertising functionality, normally because the browser publisher simply uses the advertising space to subsidize the cost of producing the browser application.

Other improvements that originate from moving advertising statistics into the browser or applications core functionality will be apparent to those skilled in the art.

4. Because the browser/application/system is more aware of the operating environment than an HTML web page would normally be, the advertising has the potential to be more relevant, or context-sensitive, when implemented with adequate privacy safeguards. Despite some privacy concerns, current contextual advertising using web page or email content continues to expand and improve. As such, implementing the present invention with an existing commission-based context-sensitive advertising affiliate program, such as AdSense from Google, has the potential to significantly improve the services provided by that program.

5. Because the browser/application/system can be integrated directly with multimedia players and digital rights management, affiliate/online advertising can tap into an entirely new tracking and reporting mechanism for managed content, which includes P2P networks. These new features will not only benefit the functionality of multimedia advertising, but also aid anti-piracy and anti-infringement causes as well.

Backwards Compatibility & Use With External Affiliate Programs or Ad Networks

An important characteristic in the successful evolution/migration to a new advertising paradigm is the ability to interface, as seamlessly as possible, with the existing models and current applications. In the context of the present invention, this means ensuring backwards compatibility with pre-existing browsers/applications/systems, and encouraging horizontal implementation within existing affiliate programs and advertising networks. The present invention provides solutions and mechanisms to achieve both of these ends.

Preventing incompatibility issues in older browsers and applications that have not implemented the Affiliate Markup Language, is possible with a straightforward work around, or alternatively, with other more advanced techniques. In one solution, an Affiliate Markup Language tag structure can contain an embedded standard image link and destination link to act as a default advertisement in case the browser/application/system does not recognize the Affiliate Markup Language tag structures as such. This is made possible because most browser/applications simply ignore tag structures that they are not built to recognize or handle/interpret. This particular solution is described in more detail below. A more advanced technique involves the use of Javascript to determine the client's exact browser/application/system in order to determine compatibility with different online advertising mechanisms. Utilization of these techniques, and others, will be apparent to those skilled in the art.

In order for existing advertising programs to take advantage of the benefits of an Affiliate Markup Language, it is necessary to configure those advertising programs to handle, or respond to, requests made through the markup language system. This type of configuration can occur in many ways, but two specific approaches are:

a) interaction through the use of a plug-in/module that automatically integrates with the current affiliate advertising system allowing it to appropriately respond to requests made by the markup language and/or Affiliate Registry.

b) interaction through the use of an administrative web site or computer application that allows the existing affiliate advertising program to manually configure operation of the markup language with respect to that particular program.

The optimal solution is actually a hybrid of these two approaches. Consequently, one of the fundamental roles of the central Affiliate Registry co-operative is to develop these tools to promote the expanded use of the markup language. Other methods of interfacing between existing affiliate programs and the Affiliate Markup Language functionality will be apparent to those skilled in the art.

Use Beyond the Traditional Web Browser

Although the web browser is the typical application used in the delivery of online information and advertising, there are many other systems and applications that benefit from a standardized Affiliate Markup Language and central Affiliate Registry.

Generally speaking, the applications anticipated for use with the present invention are any computer programs capable of displaying advertising on any variation of desktop computer, laptop, PDA, digital audio/video player or wireless device. Sample network applications include email clients, RSS clients, instant messaging platforms, news clients, online games, network media players, and other miscellaneous information browsers, such as Sherlock from Apple Computer.

However, it is important to note that it is not required that the application itself have any core/primary online functionality. In other words, as long as the application is in an environment allowing access to advertising services, the application itself can integrate advertising, online or otherwise, into whatever core functionality the application already provides. As such, a computer video game, a word processing program, a media player, or any other program not requiring the Internet for "normal" operation could nonetheless integrate advertising mechanisms, if desired.

It is also intended that entire operating systems and other browsers on various platforms benefit from the present invention, especially as digital media platforms continue to converge, or at least interact/interface. Based on the discussion above, it is not hard to extend the use of affiliate advertising to the broader computer operating system, provided the operating system publisher desired to add such functionality. As such, the operating system could implement its very own advertising network and/or display advertisements at its discretion, from startup to shutdown.

In a similar context, for some embodiments no online functionality is required whatsoever. In one such embodiment, compact discs (CDs) and/or digital video discs (DVDs) are authored/created with markup language elements to enable user-interface advertising upon insertion, playback or ejection.

Just as relevant is the fact that the online advertising models of the present invention can also be applied to other types of systems and/or platforms. For example, cable and satellite distribution platforms for television, entertainment, and other information. In this scenario, television broadcasters are the Webmaster/Publishers and the cable and satellite providers are the Browser Publishers. By implementing the functionality of the Affiliate Markup Language (or more general Advertising Markup Language) within the context of television viewing, a new mechanism to share and develop advanced advertising appears. Similarly, it is intended that the central Affiliate Registry develop advertising functionality for emerging and converging networks, not limited to just the Internet. For example, this hybrid model could be used to provide affiliate advertisement commissions for:

a) linking television programming to Internet advertisements, with the television programmer's consent.

b) linking television commercials to the ability to immediately purchase the product over a network connection.

c) displaying non-intrusive digital advertisements, similar to the superimposed advertisements displayed on baseball backstops or football fields during televised games.

d) displaying non-intrusive "crawl" advertisements on the fringes of the television viewing area.

Other non-web browser application or system implementations of the present invention will be apparent to those skilled in the art.

FIG. 1 depicts a block diagram 100 of the relationships between the entities and/or components of a suitable embodiment of the invention. Central Affiliate Registry 102 assigns a universal unique identifier to Webmaster/Publishers 106. Connecting element 104 represents the interaction between the central Affiliate Registry 102 and Webmaster/Publisher 106. Besides the initial interaction of assigning a unique identifier, other interactions at 104 might include maintenance of centralized contact information, campaign management, reporting/statistics functions, and payment of commissions to the Webmaster/Publisher 106. By creating a centralized database of Webmaster/Publisher information, the Affiliate Registry can also help implement improved fraud control by aggregating information about the history or reputation of Webmaster/Publishers. The Affiliate Registry can also specialize in validating or verifying affiliate information as a value-added service to further prevent fraud. Other interactions at 104 will be apparent to those skilled in the art.

Typically, a Webmaster/Publisher 106 publishes web pages or web sites 132 using a markup language such as HTML. The act of publishing a web page 132 is depicted at connecting element 128. An end-user 136 utilizes the Internet to access or view the published pages with a network browser 130. The act of "surfing" the Internet by end-user 136 is depicted by connection element 134. A network browser 130 is published (typically as software) by one or more entities 114. Sample browser publishers include Microsoft, AOL, Mozilla, and Netscape. Connecting element 126 depicts the act of publishing a browser 130 for use by end-user 136. The typical relationship between entities 106, 136 and 114 will be apparent to those skilled in the art.

The introduction of a standardized affiliate markup language is represented at 108. Connecting elements 110 and 112 represent publishing the specifications of the markup language 108 so that Webmasters/Publishers 106 and Browser Publishers 114 can implement the markup language accordingly. Webmaster/Publishers 106 require the specifications to utilize the functionality of the markup language within their advertising, and Browser Publishers 114 require the specifications to make possible the functionality of the markup language within the browser or application or system. With these elements in place, browser/application/system enabled affiliate advertising using the Affiliate Markup Language is possible.

In this example, Browser Publishers 114 are interacting directly with the central Affiliate Registry 102 and/or Browser Affiliate Programs 120 through connecting elements 116 and 118, respectively. The relationship represented by connecting element 116 is an instance where the central Affiliate Registry 102 acts as the default advertising network providing advertising content upon request, as illustrated at 300 and described further below.

Browser Affiliate Programs 120 represent affiliate networks that have been configured or enabled to function with the Affiliate Markup Language and/or central Affiliate Registry. The relationship represented by connecting element 118 exists if a Browser Publisher opts not to use the default advertising network of the central Affiliate Registry 102, and instead operates it's own advertising network 120, or utilizes a third-party advertising network, enabled for use with the Affiliate Markup Language. At connector 122 the Affiliate Programs represented at 120 are interacting directly with the Webmaster/Publisher 106, similar to the relationship that Webmaster/Publishers and currently existing affiliate programs share. The nature and extent of this relationship will be apparent to those skilled in the art.

Connecting element 124 represents any interaction a Browser Affiliate Program might have with the central Affiliate Registry 102. Examples of such interactions include:

a) configuring the specific affiliate program for use with the Affiliate Markup Language.
b) acquiring updated contact information for a webmaster/publisher in order to issue advertising commissions as necessary.
c) information sharing about fraud in order to help prevent future instances of abuse.
d) correlation of affiliate identifiers to facilitate affiliate pooling or affiliate mapping.

Other embodiments, similar to the embodiment of FIG. 1, utilizing the Affiliate Markup Language 108 and central Affiliate Registry 102 will be apparent to those skilled in the art.

Elements of an Affiliate Markup Language Tag

FIG. 2 is a sample HTML-style tag utilizing the Affiliate Markup Language, 200. Section 202 defines the opening tag structure of an element within the markup language. The word "affiliate" at 202 signifies intent to utilize, implement, or conform to, the standards of the markup language. Sections 204-258 describe specific configurable elements/attributes of tag 200. In sections 204-258 the character string on the left side of the equal sign (=) is the element variable name, and the character string on the right side is the assigned variable value for the particular configuration. In this way, the equal sign (=) acts as an assignment operator. Proper evaluation and interpretation of configuration variables and variable assignment will be apparent to those skilled in the art.

Element 204 represents the configuration mechanism indicating the assigned unique identifier of the webmaster/publisher. In 204 the unique identifier has the value 1234567890. The unique identifier is used to assign proper credit for affiliate tracking of transactions.

Element 206 represents a configuration variable to establish multiple pre-defined "profiles" and implement the saved profiles when referenced. In 206 the profile variable is set to the value 5, indicating stored profile #5 should be implemented. Profiles can be used to pre-set any number of configuration variables, and as such can be used as shortcuts for frequently used settings or combinations of settings. Other uses for pre-defined profiles or configuration "sets" will be apparent to those skilled in the art.

Elements 208 and 210 represent standardized size variables for tag 200, namely width and height settings. In 208 the configuration width is set to 468 pixels, and in 210 the configuration height is set to 60 pixels.

Element 212 represents a configuration variable to establish the type of advertisement to display. In 212 the configuration type is set to "banner" indicating a banner advertisement. Other possible advertisement types include "interstitial", "pop under", "skin/theme", "link", "audio", "crawl", and "exit." Other advertisement types will be apparent to those skilled in the art.

Element 214 represents a configuration variable to establish the preferred method or model of advertising. In 214 the configuration method indicates that the affiliate prefers CPA, CPC, or Banner Exchange as the advertising model, in that particular prioritized order. By implication, this particular setting also indicates that the affiliate prefers that CPM models not be used. In other implementations, an affiliate may specify one or more preferred methods, or might specify "ALL" to allow any available advertising model to be used as necessary. Other advertising models will be apparent to those skilled in the art.

Element 216 represents a configuration variable to establish the style of the advertisement. In 216 the style is set to "static" indicating the preference for a non-dynamic, non-animated graphic. Alternatively, the style could be set to "animated" to indicate preference for a banner with animation, or "interactive" to indicate a preference for an advertisement that engages the end-user. Other advertising styles will be apparent to those skilled in the art.

Element 218 represents a configuration variable to establish the preferred or allowed media types to be used in the advertisement. In 218 the configuration indicates that the affiliate webmaster is specifically allowing advertisements in Text, GIF, JPG, AVI, Flash, or Java format (in preferred/prioritized order). In other implementations, an affiliate may specify one or more preferred media types, or might specify "ALL" to allow any available media type to be used. Other advertising media types will be apparent to those skilled in the art.

Element 220 represents a configuration element enabling or disabling dynamic/refreshing ad rotation. In 220 the configuration element for rotation is enabled, indicating that the advertisement should "refresh" with a new advertisement at a certain interval, even though the current page may not have reloaded. Element 222 represents a configuration variable to establish the refresh rate, in seconds, if "rotation" element 220 is enabled. In 222 the refresh rate is set to 20 seconds, indicating a new advertisement should be rotated into the advertising space every 20 seconds. Since the browser is controlling refreshing the advertising in the current invention, there is no specific need for complicated Java, Javascript, or Flash, which currently are required for most types of refreshed advertising. Use of rotating advertisements and refresh rates will be apparent to those skilled in the art.

The elements represented at 224 establish a number of keywords associated with the advertisement defined by the tag structure, 200. Keywords are single words or small phrases (usually two, three or four words) that help define the context of the advertisement. Normally this means that the keywords either describe the content of the web site or web page where the Affiliate Markup tag is situated, or they describe the desired content of the target advertisement to be displayed. In either case, the keywords are used by the affiliate registry to determine appropriate, or related, advertisements to deliver. This is commonly referred to as "contextual advertising." The relative order of the keywords is also used to determine the corresponding relative importance of the keywords. Thus, keyword #1 "football" is given more priority than keyword phrase #2 "Berkeley California", and keyword phrase #2 is given more priority than keyword #3 "sports." An arbitrary number of keywords are technically feasible, although too many keywords may reduce the effectiveness of using keywords in the first place. Effective use of keywords will be apparent to those skilled in the art.

Element 226 represents a configuration variable to establish keyword(s) to avoid. Whereas the keywords at 224 suggest words or phrases of association, the keyword(s) at 226 suggest words or phrases of disassociation for the returned advertisement. At 226 the avoidance keyword is set to "stanford" indicating that the any advertisements returned by the registry should avoid any association with that particular keyword. A common use of this feature would be to make sure that a competitor or rival's advertisement is not inadvertently displayed on a webmaster/publisher web site. Although not displayed in 200, a plurality of prioritized keywords to avoid is also possible, similar to the ordered structure of 224. Proper use of avoidance keywords will be apparent to those skilled in the art.

Element 228 represents a configuration variable to establish a sub-tracking value for more detailed statistical information. By providing sub-tracking capability, the webmaster/publisher has the ability to evaluate very complex and comprehensive information about the displayed advertisements. As a simple example, the sub-tracking value may be set to report back the page or "zone" upon which the advertisement is displayed. This is exemplified at 228 where the sub-tracking value has been set to "home_page" indicating that the tag is situated on the main or "home" page of the web site. Another use for the sub-tracking variable 228 includes tracking for virtual affiliates or sub-affiliates as described in U.S. Pat. No. 6,804,660. It is important to note that the sub-tracking mechanism as described above can also be achieved by creating a number of "custom" configuration variables with no ascribed functionality, other than to pass along additional information for tracking or reporting purposes. Other uses for sub-tracking variables and/or custom variables will be apparent to those skilled in the art.

Element 230 represents a configuration variable to establish the positioning scheme to be used with coordinate elements 232 within tag structure 200. Common positioning schemes include "absolute" or "relative" indicating how to interpret the coordinate values of 232. The elements represented at 232 designate X and Y coordinates on a two dimensional plane that corresponds to the browser or application window. If the positioning scheme is set to "absolute" the coordinates at 232 represent the positioning of the advertisement relative to the margin (0,0) in the upper left corner of the browser or application/system window. If the positioning scheme is set to "relative" the coordinates at 232 represent offsets from the tag position within the normal HTML page structure. As such, in the "relative" scheme the margin (0,0) is at the tag element, rather than the top left corner of the window. Although not depicted in this example, a third dimensional coordinate "Z" could also be implemented/configured in order to create a three dimensional "stacking" of advertising components. Proper use of the positioning scheme variable and corresponding coordinate values will be apparent to those skilled in the art.

Element 234 represents a configuration variable to establish the "alternative text" value within the current tag structure. Tag element 234 serves the same basic purpose/function as the analogous "alt" tag element as defined in standard HTML. Use of the "alt" tag element will be apparent to those skilled in the art.

Element 236 represents a configuration variable to establish "site ratings" for a particular web site, akin to the current ratings systems used by the motion picture, television and video game industries to define intended audiences and alert to the nature of the content. It is not necessary to implement a new ratings system, as the categories and classifications already widely accepted are adaptable to the current invention. At 236, the site rating has been assigned the value "GA" indicating that "General Audiences" are intended for this web site. Proper use of site ratings will be apparent to those skilled in the art. Also see: http://w3c.org/PICS/

Element 238 represents a configuration element to set the language attribute for this tag structure. In 238 the language variable is set to the value "en"—indicating the displayed advertisement should be composed in English, if practicable. Two-letter language codes are defined by the International Organization for Standardization (ISO). A current list of language codes is located at: http://www.loc.gov/standards/iso639-2/englangn.html Element 240 represents a configuration variable to establish a default image link or reference. The default image functions as a backup image or advertisement in case the affiliate registry is unable to provide an advertisement for any reason. Similarly, element 242 represents a configuration variable to establish a default link target or reference. The default link functions as a backup destination link in case the affiliate registry is unable to provide an advertisement link for any reason. Proper use of default image and link configuration variables 240 and 242 will be apparent to those skilled in the art.

Element 244 represents a configuration variable to establish the specific unique account for use with a specific existing external affiliate program as configured in element 246. In this capacity, elements 244 and 246 function to utilize the display features of the affiliate markup language without utilizing the advertising "network" enabled by the central Affiliate Registry. When these elements are specified in this manner the webmaster/publisher is "hard-coding" their existing external affiliate identification information 244 and program name 246 in order to override use of the universal identifier 204. In this situation, the configuration variables 244 and 246 indicate that the advertisement should come from the "xthreadz" affiliate program using "xthreadz" identifier "12345" such that neither the Affiliate Markup Language nor the central Affiliate Registry have any decision-making pertaining to the Advertiser being displayed. The subsequent benefit to the webmaster/publisher is that many of the other display configuration variables of the markup language, such as elements 208-222, 228-242, 248-258, are still usable to establish the other characteristics of the advertisement. In order to implement this functionality, it may be required that the external affiliate program configure a plug-in or module/application which enables direct use of the Affiliate Markup Language within the affiliate program, as described previously. Proper use of specific affiliate programs and identifiers within the framework of the Affiliate Markup Language and elements 244 and 246 will be apparent to those skilled in the art.

Element 248 represents a configuration variable to specify a return URL value. A return URL functions as a "link back" to the web location of origin, such that providing this information to the affiliate registry allows the system to return the web surfer to a location defined by the webmaster/publisher after the advertisement has been viewed. Proper use of a return URL will be apparent to those skilled in the art.

Element 250 represents a configuration variable to establish the border width value within the current tag structure. Tag element 250 serves the same basic purpose/function as the analogous "border" tag element as defined in standard HTML. Use of the "border" tag element will be apparent to those skilled in the art.

Element 252 represents a configuration variable to establish the target window value for the current tag structure. Tag element 252 serves the same basic purpose/function as the analogous "target" tag element as defined in standard HTML. Use of the "target" tag element will be apparent to those skilled in the art.

Element 254 represents a configuration variable to establish the country of origin of the webmaster/publisher, or similarly to indicate the target country audience for the advertisement. At instance 254 the two-character country configuration variable has been set to "US" indicating the United States, as defined by the ISO. A current list of country codes is located at: http://www.iso.org/iso/en/prods-services/iso3166ma/02iso-3166-code-lists/list-en1.html Element 256 represents a configuration variable to establish the region or locality of origin of the webmaster/publisher, or similarly to indicate the target regional audience for the advertisement. At 256 the value "CA" indicates the set region is California. Importantly, more detailed and/or granular "location" configuration variables such as county, city, province, zip code, or area code, are also possible and/or desirable. Proper use of "location" configuration variables such as 254 and 256 will be apparent to those skilled in the art.

Element 258 represents a configuration variable to specify an exact advertisement, banner, or offer to display. As such, the "exactly" specified advertisement prevents the advertising network from choosing an appropriate advertisement to display since one has been defined by the webmaster/publisher. Element 258 might also be used in conjunction with elements 244 and 246 to specify an exact advertisement to display from an external affiliate program or network, separate from the central Affiliate Registry. Proper use of configuration variable 258 will be apparent to those skilled in the art.

Element 290 closes the opening tag structure of 200. The proper use of element 290 will be apparent to those skilled in the art.

Section 292 illustrates a method to ensure backwards compatibility within older web browsers by enclosing a default advertisement link and default image reference within the bounds of 202 and 294. If the markup language is not compatible with an older browser, the tag structure bounded by 202 and 294 will be ignored. If the markup language is compatible with the browser, the browser will know to override the enclosed default link and default image as configured through elements 204-258. Some level of backwards compatibility may also be achieved through the use of "commenting out" portions of the Affiliate Markup Language, similar to what is done with Javascript to hide it from older web browsers. Alternatively, Javascript, PHP, or other scripting languages may be configured to dynamically generate/write Affiliate Markup Language tags only if they are determined to be compatible with the requesting browser/application. Other methods of backward compatibility will be apparent to those skilled in the art.

Section 294 represents a closing tag structure for 200. The proper use of element 294 will be apparent to those skilled in the art.

Importantly, the list of affiliate advertising attributes/functions defined within tag 200 is not exhaustive of the possibilities of the markup language as a whole. Other tag uses and elements will be apparent to those skilled in the art. It should also be noted that the combinations of attributes listed and described above may not all function together as configured, and as such the descriptions are simply illustrative of the range of sophistication and customization that is possible when using these elements properly. Additionally, browser/application/system "default" values can exist, such that certain configuration variables are set by the browser or application if not explicitly set by the webmaster/publisher within the tag structure.

Since the layout of FIG. 2 is exaggerated/expanded for clarity sake, Affiliate Markup tag 200 can also be represented by the following simplified/condensed character string:

<affiliate uid='1234568790' profile='5' width='460' height='68' type='banner' methods='cpa,cpc,banner_exchange' style='static' media-types='gif,jpg,avi,mpeg,flash,java' rotation='on' refresh-rate='20' keyword1='football' keyword2='Berkeley California' keyword3='sports' avoid_keyword='stanford' subtrack='home_page' position='absolute' x-pos='0px' y-pos='0px' alt='advertisement' site_rating='GA' language='en' default-img='banner.gif' default-link='home.html' specific_id='12345' specific_program='xthreadz' return_url='http:/affiliatemarkup.org/' border='0' target='_new' country='US' region='CA' exact='disabled' ><a href='home.html'><img src='banner.gif'></a></affiliate>

It is also important to recognize that an HTML tag-structure as illustrated at 200 is not the only suitable format for an Affiliate Markup Language. A parallel advertising markup language similar to XML that is more "container-like" is also possible. In a markup language with such a structure, the elements/attributes of a tag are assigned/formatted outside the "< >" tag components, as in the abridged sample below:

<affiliate>
<uid> 1234567890 </uid>
<profile> 5 </profile>
<width> 460 </width>
<height> 68 </height>
<border> 0 </border>
<type> banner </type>
<alt> advertisement </alt>
<country> US </country>
<language> en </language>
<keyword1> football </keyword1>
<subtrack> home_page </subtrack>
</affiliate>

More information on web and Internet standardization is located at: http://www.w3.org/

Browser/Application Implementation of the Affiliate Markup Language

Figure 3:
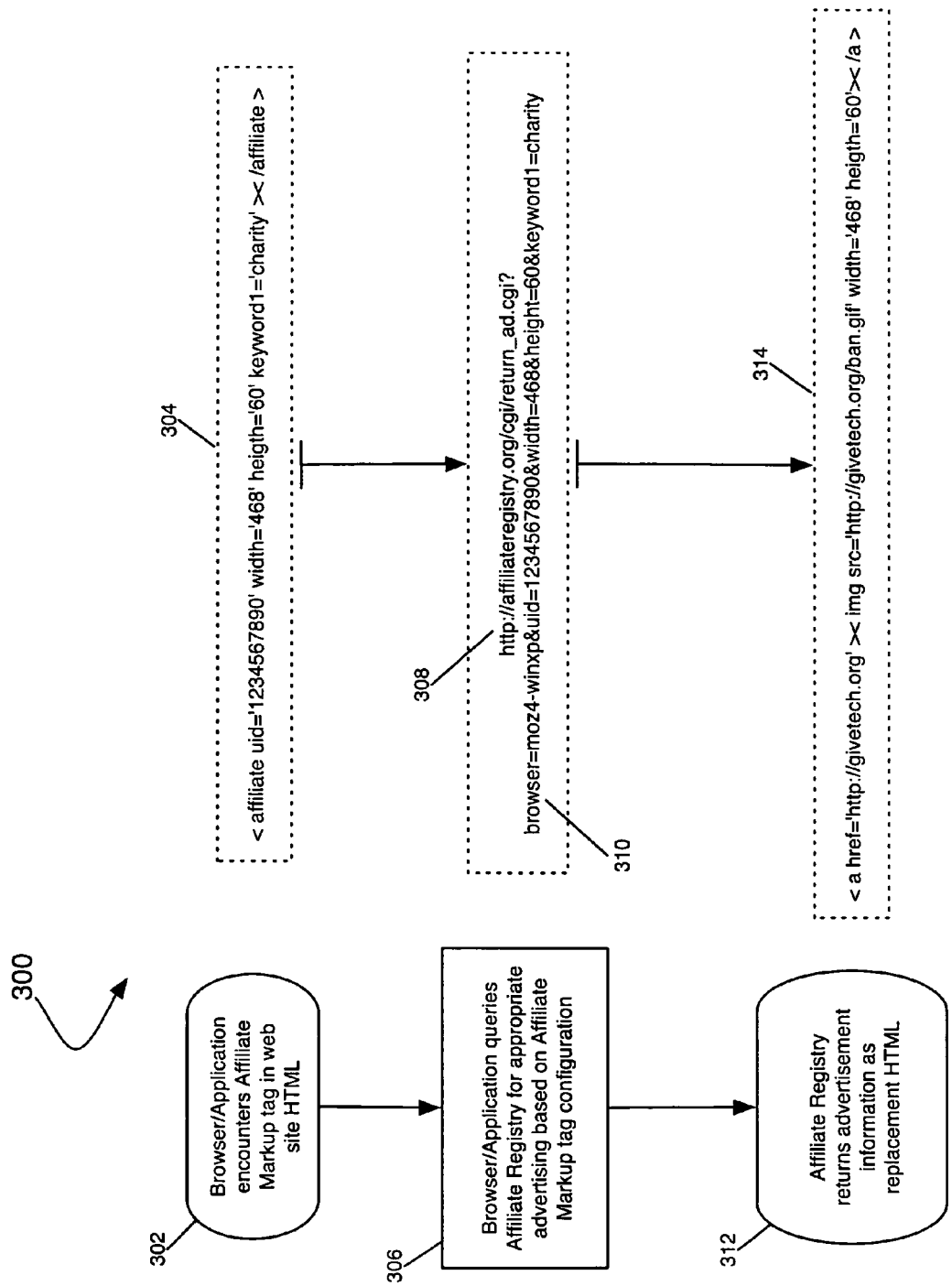
FIG. 3 is a suitable embodiment of a browser/application/system implementation of the Affiliate Markup Language.

FIG. 3 is a sample browser/application implementation of the Affiliate Markup Language, 300. At 302 the browser or application or system encounters a segment of HTML that indicates an Affiliate Markup Language tag. A sample tag with corresponding configuration variables is represented at 304. Configuration variables are described at 200.

At 306, the browser or application interfaces or communicates via HTTP with the central Affiliate Registry to receive appropriate advertising based on the configuration variables in 304. A sample query to the central Affiliate Registry is represented by the URL composed of elements 308 and 310. The text character string at 308 represent a call to a web server application, while the characters of 310 represents the "query string" which contains a representation of the configuration variables. Interpretation of the values in the query string and other methods of interfacing/communicating with the Affiliate Registry will be apparent to those skilled in the art.

The text "browser=moz4-winxp" within the query string 310 indicates the particular browser or application and operating system making the request for advertising, in this case "moz4-winxp" equates to the Mozilla 4.0 browser for Windows XP. Because different browsers, applications and operating system have different capabilities and limitations, providing this information to the central Affiliate Registry when requesting an advertisement can provide increased advertisement compatibility and context. Since this variable is the "self-identity" of the browser or application or system of the end-user, it is not a variable that can be set as a configuration element by the Webmaster/Publisher. As such, it must be explicitly set by the browser or application or system making the query.

In response to the query at 306, the Affiliate Registry returns a segment of HTML at 312 to be used by the browser or application or system to display or render the appropriate advertisement. The string of characters at 314 represent the replacement HTML to display in response to query elements 308 and 310, and originally configured in tag 304. Since the original tag 304 requested an advertisement associated with the keyword "charity" and dimensions 468×60 pixels, the returned HTML in 314 should conform to the initial configuration variables.

Other browser/application/system implementations using XML, RSS feeds, or other real-time technologies, will be apparent to those skilled in the art.

Affiliate Mapping

Figure 4:
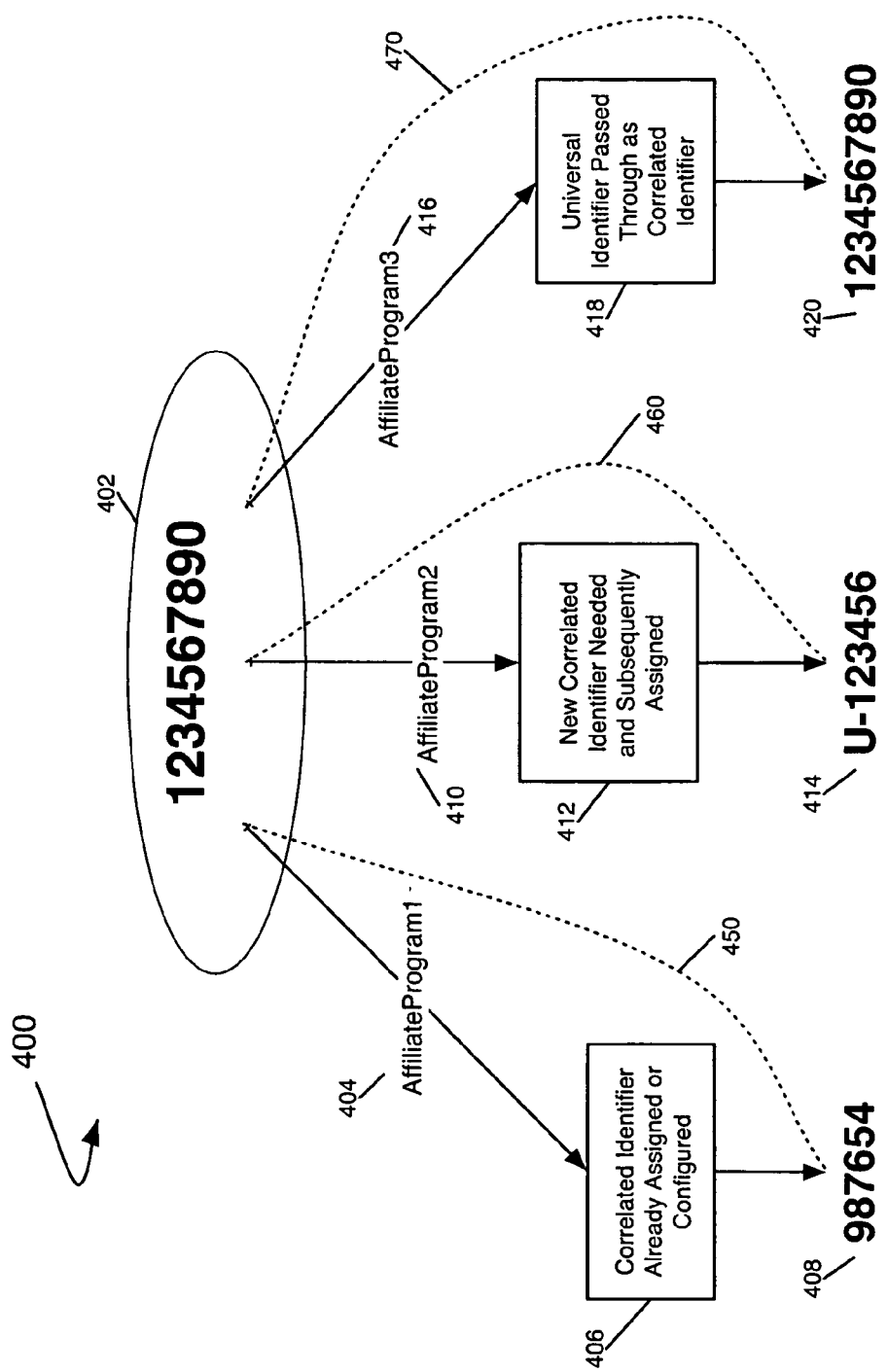
FIG. 4 is a suitable embodiment of Affiliate Mapping scenarios.

FIG. 4 illustrates the process of Affiliate Mapping 400 with the use of a universal affiliate identifier 402. In this example the character string "1234567890" is the universal affiliate identifier 402 and is mapped to three separate external affiliate identifiers 408, 414, and 420.

Affiliate Mapping sequence 450 illustrates an instance where universal affiliate identifier 402 is correlated with affiliate program identifier 404 at process 406 to yield external identifier 408. At 406 the Affiliate Mapping system recognizes that a correlated external identifier has already been assigned/configured for use with 402 and 404. The previously established external identifier in this sequence has either been assigned a correlated identifier in a previous assignment transaction or has been manually configured to override any assignment with a specific substitute identifier. External identifier 408 is compatible with the affiliate program system identified by, or associated with, 404.

Affiliate Mapping sequence 460 illustrates an instance where universal affiliate identifier 402 is correlated with affiliate program identifier 410 at process 412 to yield external identifier 414. At 412 the Affiliate Mapping system recognizes that a correlated external identifier has not yet been assigned/configured for use with 402 and 410. As such, a subsequent assignment operation establishes an appropriate and compatible external identifier 414 for use with 410. Because 402 and 410 now have an assigned external identifier, future Affiliate Mapping of these elements will be similar to the sequence previously described as 402 404 406 410.

Affiliate Mapping sequence 470 illustrates an instance where universal affiliate identifier 402 is correlated with affiliate program identifier 416 at process 418 to yield external identifier 420. In this case, identifiers 402 and 420 are identical. At 412 the Affiliate Mapping system recognizes that the correlated external identifier can be equivalent to the universal affiliate identifier. As such, the universal affiliate identifier 402 is already compatible with the affiliate program system identified by, or associated with, 416.

It is important to note that the three scenarios described above are only a few of the many types of Affiliate Mapping processes that are possible. For example, it is possible to create "session" external identifiers that are only temporarily assigned, such that a new external identifier is established for each subsequent transaction by an end-user. In a more complex scenario, the external identifier may be combined with other data and/or encrypted to facilitate use. A number of various affiliate correlation functions/mechanisms are described in significant detail in U.S. Pat. No. 6,804,660. Other mapping, assignment, and configuration scenarios will be apparent to those skilled in the art.

Figure 5:
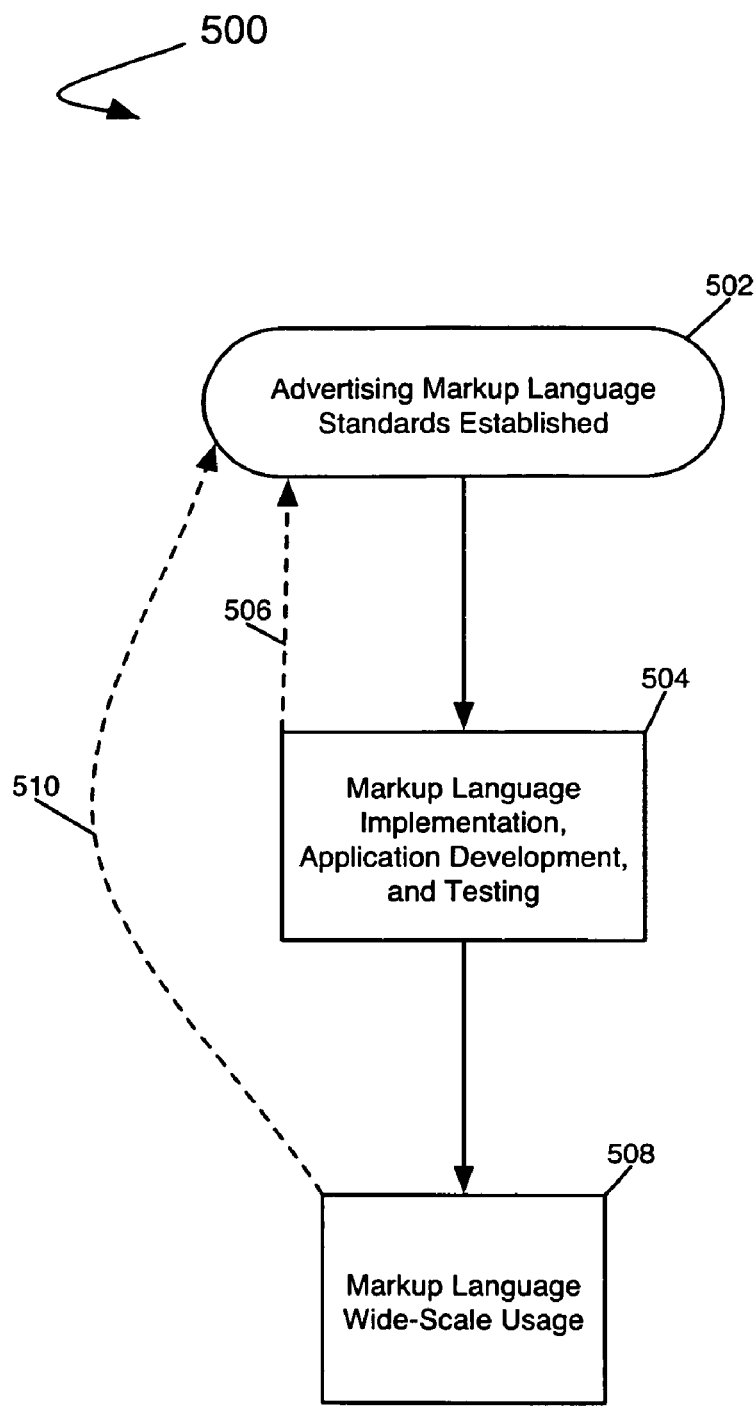
FIG. 5 is a representation of the development/implementation cycle for an Advertising Markup Language.

Advantages/Benefits of Browser Implementations
For The Webmaster/Publisher:
   Universal Affiliate ID—Aggregated Account Management
   Highly Configurable and Sophisticated Markup Language
   Multiple Advertising Models Thru One Service
     CPA
     CPC
     CPM
     Banner Exchange
   Better Impression/Hit Counting Thru Internal Browser Mechanisms
   New Locations in Browser for Ads
     Themes/Skin/Wall paper/Screensaver
     Navigation Bar
     Bookmark Manager
     Startup/Shutdown
     Dedicated Advertising Space
   Dynamic Browser Functionality—Rotation, Refresh, RSS, Push, Crawl
   Advanced Tracking Thru Integrated Media Players/Plug-ins
   Coat Tail Economies of Scale of Browser Publisher
For The Browser/Application Software Publisher:
   Control of Advertising on Web Pages
   New Revenue Streams From Affiliate Marketing
   Prevent Spyware, Viruses, and Pop-ups from Malicious Advertising
   Improve Overall Browser Experience for End-User
For The Surfer/End-User:
   Trusted/Respected Advertisers
     No Spyware, No Viruses
     Non-intrusive Pop-ups
     Privacy Guidelines
     No Fraud
   Functionality Beyond The Browser Window
For The Advertiser:
   Centralized Account Management
   Browser-Embedded Fraud Deterrence
   Registry Fraud Screening
   Improved Advertising Efficiency
   More Accurate Statistics/Reporting Advertising Markup Language Development and Implementation FIG. 5 is a block diagram 500 representing a sample cycle of development and implementation for an Advertising Markup Language. At 502 the Advertising Markup Language is conceived and conceptualized until a consensus standard can be established by an authority such as the ISO, or alternatively by a co-operative central registry. The standardization process will be apparent to those skilled in the art.

At 504 the standardized language is implemented to enable use. This includes the development of applications to utilize, administrate, configure and/or apply the Advertising Markup Language, and also requires significant mechanisms for testing, debugging, quality control, and feedback for improvement. As such, this process may lead to additions, deletions or changes of the standardized specifications developed at 502. The process of modifying the established standard based on application development and testing is represented at 506.

At 508 the Advertising Markup Language has reached a critical point whereby sufficient development has occurred so as to enable wide-scale usage in real-world applications. Although the Advertising Markup Language at 508 has achieved a level of public distribution, it is not necessarily static. Continued development of the Advertising Markup Language standard and new applications attributable to real-world advances, scenarios, processes and feedback are represented at 510.

What is claimed is:

1. A method for browser/application/system enabled affiliate advertising, the method comprising:

creating and standardizing an affiliate markup language, wherein the affiliate markup language is used to define an affiliate markup tag, and wherein a webmaster or publisher includes at least one affiliate markup tag in a webpage to enable a browser or application or operating system to control an affiliate advertising;

creating and administering a central affiliate registry, wherein the central affiliate registry is used for maintaining an advertising network, and wherein the advertising network provides advertising content upon request by the browser or application or operating system; and the browser or application or operating system controlling the affiliate advertising, wherein the browser or application or operating system communicates with the central affiliate registry to receive advertising content as indicated by a specific affiliate markup tag, and wherein the browser or application or operating system further serves as display medium for the received advertising content.

2. A method as recited in claim 1, further comprising:
creating and administering a central Affiliate Registry for webmaster/publishers, wherein the registry assigns a unique universal identifier to each webmaster/publisher.

3. A method as recited in claim 2, further comprising:
utilizing the central Affiliate Registry as a default advertising network for browser/application/system publishers implementing the Affiliate Markup Language.

4. A method as recited in claim 1, further comprising:
utilizing the Affiliate Markup Language with external affiliate programs and advertising networks, wherein the use of a central Affiliate Registry is not required.

5. A method as recited in claim 1, further comprising:
utilizing the Affiliate Markup Language with external affiliate programs and advertising networks by interfacing, directly or indirectly, with such programs and networks.

6. A system including a computer readable medium having instructions for browser/application/system enabled affiliate advertising, wherein the instructions comprise:

means for creating and standardizing an affiliate markup language, wherein the affiliate markup language is used to define an affiliate markup tag, and wherein a webmaster or publisher includes at least one affiliate markup tag in a webpage to enable a browser or application or operating system to control an affiliate advertising;

means for creating and administering a central affiliate registry, wherein the central affiliate registry is used for maintaining an advertising network, and wherein the advertising network provides advertising content upon request by the browser or application or operating system; and means for enabling the browser or application or operating system to control the affiliate advertising, wherein the browser or application or operating system communicates with the central affiliate registry to receive advertising content as indicated by a specific affiliate markup tag, and wherein the browser or application or operating system further serves as display medium for the received advertising content.

7. A system as recited in claim 6, wherein the instructions further comprising:
means for creating and administering a central Affiliate Registry for webmaster/publishers, wherein the registry assigns a unique universal identifier to the webmaster/publisher.

8. A system as recited in claim 7, wherein the instructions further comprising:
means for utilizing the central Affiliate Registry as a default advertising network for browser/application/system publishers implementing the Affiliate Markup Language.

9. A system as recited in claim 6, wherein the instructions further comprising:
means for utilizing the Affiliate Markup Language with external affiliate programs and advertising networks, wherein the use of a central Affiliate Registry is not required.

10. A system as recited in claim 6, wherein the instructions further comprising:
means for utilizing the Affiliate Markup Language with external affiliate programs and advertising networks by interfacing, directly or indirectly, with such programs and networks.

11. A computer program embodied on a computer readable medium for browser/application/system enabled affiliate advertising, comprising:

a code segment for creating and standardizing an affiliate markup language, wherein the affiliate markup language is used to define an affiliate markup tag, and wherein a webmaster or publisher includes at least one affiliate markup tag in a webpage to enable a browser or application or operating system to control an affiliate advertising;

a code segment for creating and administering a central affiliate registry, wherein the central affiliate registry is used for maintaining an advertising network, and wherein the advertising network provides advertising content upon request by the browser or application or operating system; and a code segment to enable the browser or application or operating system to control the affiliate advertising, wherein the browser or operating system communicates with the central affiliate registry to receive advertising content as indicated by a specific affiliate markup tag, and wherein the browser or application or operating system further serves as display medium for the received advertising content.

12. A computer program as recited in claim 11, further comprising:
a code segment for creating and administering a central Affiliate Registry for webmaster/publishers, wherein the registry assigns a unique universal identifier to the webmaster/publisher.

13. A computer program as recited in claim 12, further comprising:
a code segment for utilizing the central Affiliate Registry as a default advertising network for browser/application publishers implementing the Affiliate Markup Language.

14. A computer program as recited in claim 11, further comprising:
a code segment for utilizing the Affiliate Markup Language with external affiliate programs and advertising networks, wherein the use of a central Affiliate Registry is not required.

15. A computer program as recited in claim 11, further comprising:

a code segment for utilizing the Affiliate Markup Language with external affiliate programs and advertising networks by interfacing, directly or indirectly, with such programs and networks.

16. A method for browser/application/system enabled affiliate advertising, the method comprising:

a. creating and standardizing an affiliate markup language, wherein the affiliate markup language is used to define an affiliate markup tag, and wherein a webmaster or publisher includes at least one affiliate markup tag in a webpage to enable a browser or application or operating system to control an affiliate advertising;

b. creating and administering a central affiliate registry for maintaining an advertising network, wherein the advertising network provides advertising content upon request by the browser or application or operating system, and wherein the central affiliate registry is further used for at least one of:

assigning a unique universal affiliate identifier for each webmaster or publisher;

issuing payment of advertising commissions to a specific webmaster or publisher; or providing a centralized mechanism for reporting advertising statistics; and c. the browser or application or operating system controlling the affiliate advertising, wherein the browser or application or operating system communicates with the central affiliate registry to receive advertising content as indicated by a specific affiliate markup tag, and wherein the browser or application or operating system serves as display medium for the received advertising content.

17. A method for browser/application/system enabled affiliate advertising, the method comprising:

a. creating and standardizing an affiliate markup language, wherein the affiliate markup language is used to define an affiliate markup tag, and wherein a webmaster or publisher includes at least one affiliate markup tag in a webpage to enable a browser or application or operating system to control an affiliate advertising;

b. creating and administering a central affiliate registry, wherein the central affiliate registry is used for at least one of:

assigning a unique universal affiliate identifier for each webmaster or publisher;

establishing an advertising network, said advertising network providing advertising content upon request by the browser or application or operating system;

issuing payment of advertising commissions to a specific webmaster or publisher; or providing a centralized mechanism for reporting advertising statistics; and c. the browser or application or operating system controlling the affiliate advertising, wherein the browser or application or operating system communicates with the central affiliate registry to receive advertising content as indicated by a specific affiliate markup tag, and wherein the browser or application or operating system serves as display medium for the received advertising content.

* * * * *